United States Patent
Stern et al.

(10) Patent No.: US 10,742,667 B1
(45) Date of Patent: *Aug. 11, 2020

(54) SYSTEM AND METHOD FOR DYNAMICAL MODELING MULTI-DIMENSIONAL SECURITY EVENT DATA INTO A GRAPH REPRESENTATION

(71) Applicant: Cyarx Technologies Ltd., Tel Aviv-Jaffa (IL)

(72) Inventors: Amos Stern, New York, NY (US); Alon Cohen, Even Yehuda (IL); Garry Fatakhov, Holon (IL); Gad Rosenthal, Netanya (IL); Menashe Ehud Har, New York, NY (US)

(73) Assignee: Cyarx Technologies Ltd., Tel Aviv-Jaffa (IL)

( * ) Notice: Subject to any disclaimer, the term of this patent is extended or adjusted under 35 U.S.C. 154(b) by 126 days.

This patent is subject to a terminal disclaimer.

(21) Appl. No.: 15/221,121

(22) Filed: Jul. 27, 2016

Related U.S. Application Data

(63) Continuation-in-part of application No. 15/001,865, filed on Jan. 20, 2016, now Pat. No. 10,262,133.

(51) Int. Cl.
*H04L 29/06* (2006.01)
*G06N 5/02* (2006.01)

(52) U.S. Cl.
CPC ......... *H04L 63/1416* (2013.01); *G06N 5/022* (2013.01)

(58) Field of Classification Search
CPC .................. H04L 63/1416; G06N 5/022
USPC ............................................. 726/22
See application file for complete search history.

(56) References Cited

U.S. PATENT DOCUMENTS

| | | | | |
|---|---|---|---|---|
| 9,306,965 | B1* | 4/2016 | Grossman | H04L 63/1416 |
| 9,697,355 | B1* | 7/2017 | Park | G06F 21/552 |
| 2009/0281895 | A1* | 11/2009 | Selinger | G06Q 30/02 |
| | | | | 705/14.43 |
| 2011/0145920 | A1* | 6/2011 | Mahaffey | G06F 21/564 |
| | | | | 726/22 |
| 2012/0216243 | A1* | 8/2012 | Gill | G06F 21/55 |
| | | | | 726/1 |
| 2013/0238659 | A1* | 9/2013 | Roitman | G06F 21/6227 |
| | | | | 707/781 |

(Continued)

OTHER PUBLICATIONS

"Memory". TechTerms. https://techterms.com/definition/memory (Apr. 5, 2018) (Year: 2018).

(Continued)

*Primary Examiner* — Eleni A Shiferaw
*Assistant Examiner* — Sakinah White Taylor
(74) *Attorney, Agent, or Firm* — M&B IP Analysts, LLC

(57) ABSTRACT

A method and system for modeling cyber-security events are provided. The method includes receiving a plurality of cyber-security events, wherein each of the plurality of the cyber-security events defines at least one entity; for each of the plurality of received cyber-security events, processing a received cyber-security event to identify at least one key-value; mapping the at least one identified key-value to at least one data field; modeling the received cyber-security event to a security model, wherein the security model defines a specific activity related to the at least one entity, wherein the modeling is based on at least one modeling rule and the at least one identified key-value; and generating a graph based on the security model.

17 Claims, 7 Drawing Sheets

(56) References Cited

U.S. PATENT DOCUMENTS

| | | | |
|---|---|---|---|
| 2014/0032617 A1* | 1/2014 | Stanfill | G06F 16/25 |
| | | | 707/809 |
| 2014/0280130 A1* | 9/2014 | Kumar | G06F 16/9024 |
| | | | 707/736 |
| 2014/0337971 A1* | 11/2014 | Casassa Mont | G06F 21/552 |
| | | | 726/22 |
| 2014/0380485 A1* | 12/2014 | Ayyagari | H04L 63/1433 |
| | | | 726/25 |
| 2015/0356301 A1* | 12/2015 | Diehl | G06F 21/577 |
| | | | 726/22 |
| 2016/0021135 A1* | 1/2016 | Chesla | H04L 63/02 |
| | | | 726/23 |
| 2016/0212171 A1* | 7/2016 | Senanayake | H04L 63/20 |
| 2017/0093910 A1* | 3/2017 | Gukal | H04L 63/1416 |
| 2017/0134410 A1 | 5/2017 | Muddu et al. | |
| 2017/0233105 A1* | 8/2017 | Vali | G06Q 10/06 |
| | | | 701/3 |

OTHER PUBLICATIONS

"Processor". The Computer Desktop Encyclopedia (CDE). http://lookup.computerlanguage.com/ (Oct. 5, 2017) (Year: 2017).

* cited by examiner

SYSTEM AND METHOD FOR DYNAMICAL MODELING MULTI-DIMENSIONAL SECURITY EVENT DATA INTO A GRAPH REPRESENTATION

CROSS-REFERENCE TO RELATED APPLICATIONS

This application is a continuation-in-part of U.S. patent application Ser. No. 15/001,865 filed on Jan. 20, 2016, now pending, the contents of which are herein incorporated by reference for all that they contain.

TECHNICAL FIELD

The present disclosure relates generally to cyber security, and more particularly to analysis of modeling of cyber-security event for allowing display of such events intuitive manner.

BACKGROUND

As usage of computers and the Internet has increased exponentially in recent years, computer viruses, data leaks, network outages, and other results of cyber-attacks have become incredibly significant. These results can yield a wide variety of harmful effects, from user inconvenience to significant financial or physical damage. Enterprises often rely on computer systems for daily transactions and to store sensitive or otherwise potentially valuable information. Such systems and information are key targets for malicious cyber activity. The harmful effects are amplified as the size of the target's computer networks and systems increase. To combat cyber-attacks, these organizations deploy cyber security systems for detecting and mitigating potential cyber-attacks.

Due to the vast array of types of cyber-attacks, cyber security systems and, in particular, cyber security systems of large organizations, include increasing numbers of security controls from a multitude of sources for responding to threats. Each of these controls may be focused on a different aspect of an organization's security and may generate a variety of alerts related to potential security threats. To manage potential security threats, solutions for security information and event management (SIEM) have been developed. SIEM solutions attempt to provide real-time analysis of security alerts including, for example, logs of security events representing potentially malicious activity.

Existing SIEM solutions face challenges in utilizing security alert information to aid in identification and mitigation of ongoing threats. In particular, some existing solutions provide information regarding each generated security alert in a log format. These existing solutions typically result in overly cumbersome amounts of data to be analyzed manually by cyber security experts. The large amounts of data (typically thousands of events are generated daily in a small business origination) often prominently feature massive amounts of false positives. Therefore, security alerts related to true malicious activity may not be given appropriate attention, and security experts may fail to properly address the malicious activity.

To organize the vast amounts of information provided by SIEM systems and the like, some existing solutions utilize static rules for aggregating data related to security alerts from different security systems and for organizing the aggregated data. As such, the existing solutions nevertheless fail to provide truly appropriate responses to ongoing threats because they lack flexibility in organizing the data. Furthermore, existing solutions fail to process the events to extract only meaningful information and display of such information in intuitive way to users, such as cyber security experts. This drawback may result in data that still includes numerous false positives and does not provide complete information regarding true security threats to cyber security experts.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some embodiments disclosed herein include a method for modeling cyber-security events. The method comprises receiving a plurality of cyber-security events, wherein each of the plurality of the cyber-security events defines at least one entity; for each of the plurality of received cyber-security events, processing a received cyber-security event to identify at least one key-value; mapping the at least one identified key-value to at least one data field; modeling the received cyber-security event to a security model, wherein the security model defines a specific activity related to the at least one entity, wherein the modeling is based on at least one modeling rule and the at least one identified key-value; and generating a graph based on the security model.

Some embodiments disclosed herein also include a system for or contextually analyzing potential security threats. The system comprises a processing circuitry; and a memory, the memory containing instructions that, when executed by the processing circuitry, configure the system to: receive a plurality of cyber-security events, wherein each of the plurality of the cyber-security events defines at least one entity; for each of the plurality of received cyber-security events, processing a received cyber-security event to identify at least one key-value; map the at least one identified key-value to at least one data field; model the received cyber-security event to a security model, wherein the security model defines a specific activity related to the at least one entity, wherein the modeling is based on at least one modeling rule and the at least one identified key-value; and generate a graph based on the security model.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
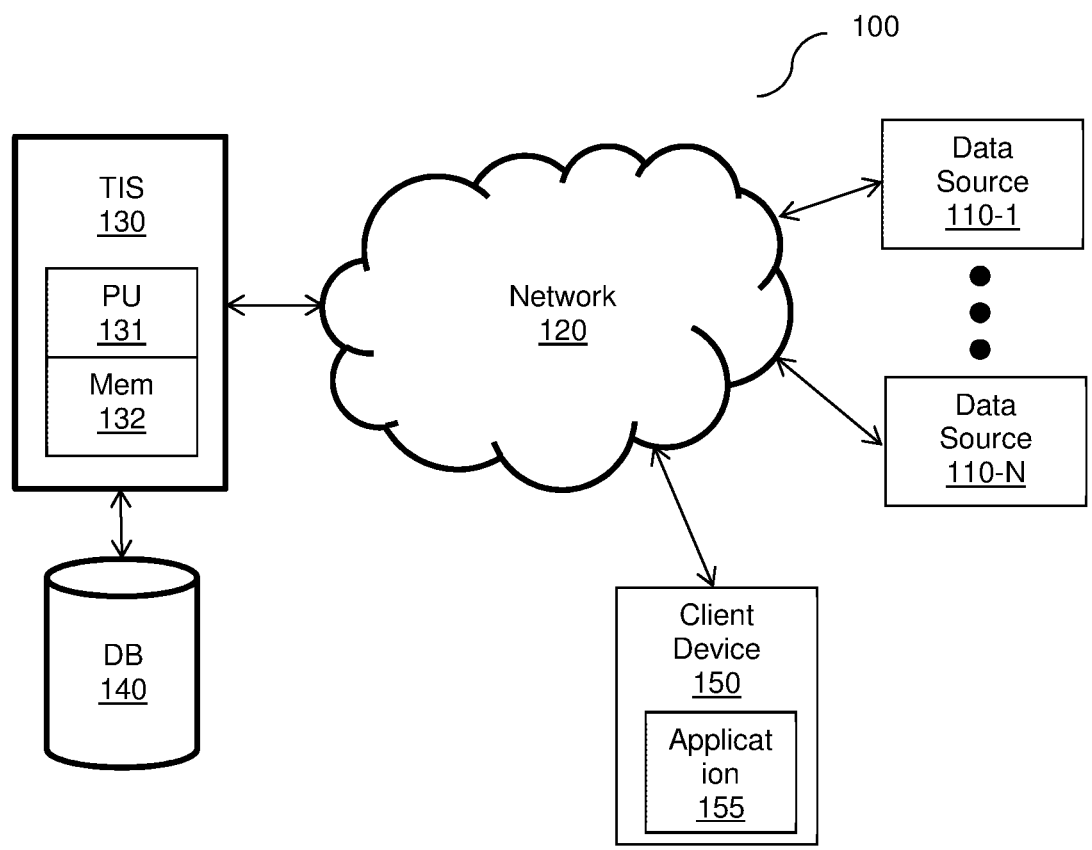
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an example network diagram 100 utilized to describe the various disclosed embodiments. The network diagram 100 includes a plurality of data sources 110-1 through 110-N (hereinafter referred to individually as a data source 110 and collectively as data sources 110, merely for simplicity purposes), a network 120, a threat investigation system (TIS) 130, a database 140, and a client device 150.

Each of the data sources 110 generates and outputs information including, but not limited to, cyber-security events and cases. A cyber-security event includes or designates at least one entity. An entity may include, for example, a host, a user, a network address (e.g., IP address), a system, a device, and the like. A case may include rules corresponding to one or more events respective of one or more entities. In some embodiments, cases may not be input to the threat investigation system 130.

The data sources 110 may include, but are not limited to, security information management (SIM) systems, security event management (SEM) systems, security information and event management (SIEM) systems, events management repositories (e.g., SPLUNK®), security detection systems (e.g., intrusion protection systems (IPSs), web application firewalls (WAFs), database (DB) security systems, endpoint security systems, network access control (NAC) systems, case management systems, application programming interfaces (APIs), and the like.

The threat investigation system 130 is communicatively connected to the data sources 110 via the network 120. The network 120 may be, but is not limited to, a wireless, cellular or wired network, a local area network (LAN), a wide area network (WAN), a metro area network (MAN), the Internet, the worldwide web (WWW), similar networks, and any combination thereof.

The threat investigation system 130 is configured to receive at least cyber-security events from the data sources 110. In an embodiment, the events may be included in source files from the data sources 110. Examples for such files are XML, JSON, CSV, or other proprietary formats, such as STIX. In an embodiment, the threat investigation system 130 includes one or more interfaces (e.g., APIs) and connectors configured to support the various different data formats of files.

The threat investigation system 130 is configured to process the received events and to security model one or more related events' entities and relationship types between them to identify entities and relationships that are common between the entities. Each identified entity may represent a source or a destination of an event. In an embodiment, the artifact may be added to describe the entity. For example, if an email is sent to a user, then the email subject and attachment (if any) will be designated with the entity. The threat investigation system 130 is further configured to determine the relationship types between entities, event directions, connection types between entities, events groups, and so on. Events that do not demonstrate relationships that are common between the entities are modeled into a default security model type.

According to an embodiment, a predefined set of security-models (or models) are provided. A security model defines a specific activity related to the at least one entity. Such security models include, but are not limited to, host-to-host, user-to-host, user-to-user, and host-to-itself models. The system 130 attempts to map all events to at least any of these security models. In an embodiment, a default model is selected to allow a default modeling of events. The modeling is based on the information encapsulated in the events and a set of mapping results.

In an embodiment, based on the modeling of events, the threat investigation system 130 is configured to generate a graph demonstrating relationships among entities designated in the events. The graph may be illustrated via a visual representation. The visual representation allows a user (e.g., a cyber security expert) to efficiently identify patterns or other notable features of events in real-time, thereby accelerating analysis of events received from multiple sources and decreasing overall investigation times. The threat investigation system 130 may further be configured to store the graph in, e.g., the database 140.

In one embodiment, the graph further includes a data layer which may be associated with any entity, connections, or a combination thereof, depicted in the graph. The data layer may include data from the events, enrichment information, or both. The enrichment information may include, but is not limited to, entity enrichment information, threat intelligence information, information gathered from organization silos, information gathered from customer repositories, information gathered from service providers, and so on. The entity enrichment information may include, but is not limited to, whether each entity is an internal entity or an external entity. An internal entity belongs to the organization. The threat intelligence information may be based on monitoring of, e.g., commercial feeds, open source systems, information sharing and analysis centers, TOR exit nodes, and the like. The enrichment information may be retrieved from external sources.

In another embodiment, the threat investigation system 130 may be further configured to generate an analysis report based on the graph. The analysis report may include, but is not limited to, the graph, a visual representation of the graph, threat level events or event groups, statistics, contextual information, and so on. The statistics may include, but are not limited to, a number of events, a number of event groups, and so on.

The threat investigation system 130 may be further communicatively connected to the client device 150 via the network 120. The client device 150 may be, but is not limited to, a personal computer, a laptop, a tablet computer, a smartphone, and the like.

In some example configurations, the client device 150 may include an application 155 installed therein. The application 155 may be, but is not limited to, a mobile application, a software application, and the like. The application 155 may receive the graph from the threat investigation system 130 and cause a display of a visual representation of the graph, a user interface (e.g., a graphical user interface), or both on the client device 150. In an embodiment, the application 155 is configured to receive and display the graph in real-time. In certain configurations, the application 155 is also adapted to receive, from the threat investigation system 130, a data structure including entities and their connections, and to render the graph on the client device 150 respectively.

Upon receiving an interaction with the user interface, the application 155 sends information regarding the user interaction to the threat investigation system 130. The threat investigation system 130 is configured to send, in real-time, additional information based on the user interaction, thereby illustrating a drill-down investigation respective of the user interaction. As an example, if a user clicks on a particular entity depicted in the graph, the application 155 sends information about the click to the threat investigation system 130, which provides more details about the case for the application 155 to display to the user.

It should be noted that FIG. 1 is described with respect to a single client device 150 merely for simplicity purposes and without limitation on the disclosed embodiments. Multiple client devices may be communicatively connected to the threat investigation system 130 via the network 120 without departing from the scope of the disclosure. It should be further noted that the database 140 may be connected to or included in the threat investigation system 130 without departing from the scope of the disclosure.

It should be understood that the embodiments disclosed herein are not limited to the specific architecture illustrated in FIG. 1 and other architectures may be used without departing from the scope of the disclosed embodiments. Specifically, the threat investigation system 130 may reside in a cloud computing platform or a virtual platform (not shown) or a datacenter connectable to a cloud computing platform. Moreover, in an embodiment, there may be a plurality of threat investigation systems operating as described hereinabove.

Figure 2:
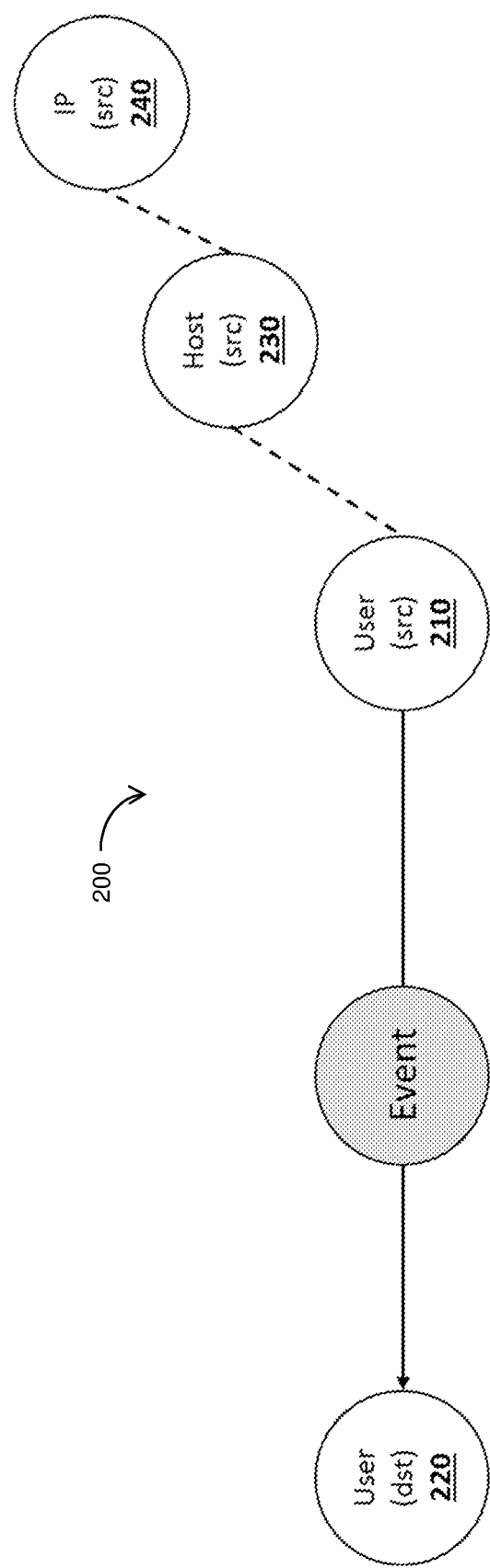
FIGS. 2-6 illustrate graphs generated based on different security models for modeling cyber-security events according to one embodiment.

Following are some non-limiting examples for mapping of security events. FIG. 2 illustrates a graph 200 of modeling to an event using a user-to-user model. The event is generated by Microsoft Windows® informing that a user account has changed. The change is performed by a source user (src) 210 on an account of a destination user (dst) 220. The connection between the entities representing the source user 210 and the destination user 320 shows the direction of the event. The graph 200 may be rendered or re-rendered to display additional entities and connections noted in (dashed lines). For example, the source host 230 and its IP address 240 and their respective connections can be included in the graph as well. The entities 230 and 240 may be displayed upon request by a user.

Figure 3:
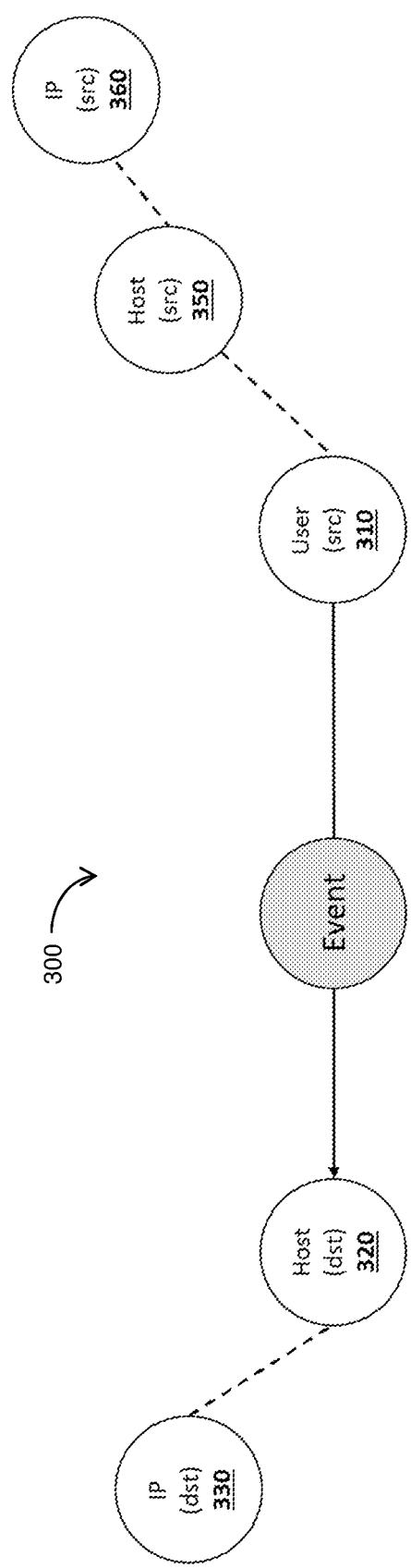

FIG. 3 illustrates a graph 300 of modeling to an event using a user-to-host model. The event is generated by Microsoft Windows® informing that a Kerberos pre-authentication failed. A source user 310 attempted to login in to a destination host 320. The connection between the entities representing the source user 310 and the destination host 320 shows the direction of the event. The graph 300 may be rendered or re-rendered to display additional entities and connections noted in (dashed lines). The source host 350 and its IP address 360 as well as the destination host 320 and its IP 330 addresses are included in the graph 300 as well.

Figure 4:
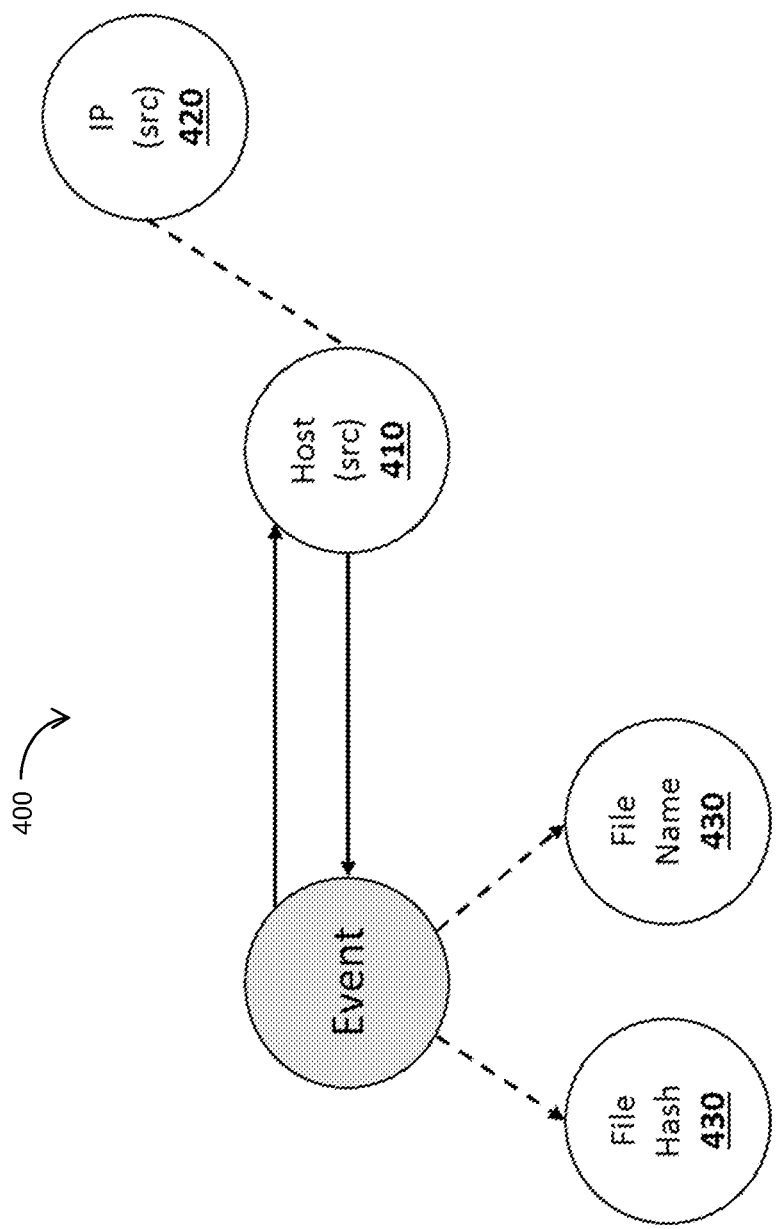

FIG. 4 illustrates a graph 400 of modeling of an event using a host-to-itself model. The event is generated by an anti-virus tool Symantec® SEP that has identified a malicious file on the host (src) 410 having a source IP (src) 420. The event can be complemented by artifacts, such a file name and file hash of the file being affected.

Figure 5:
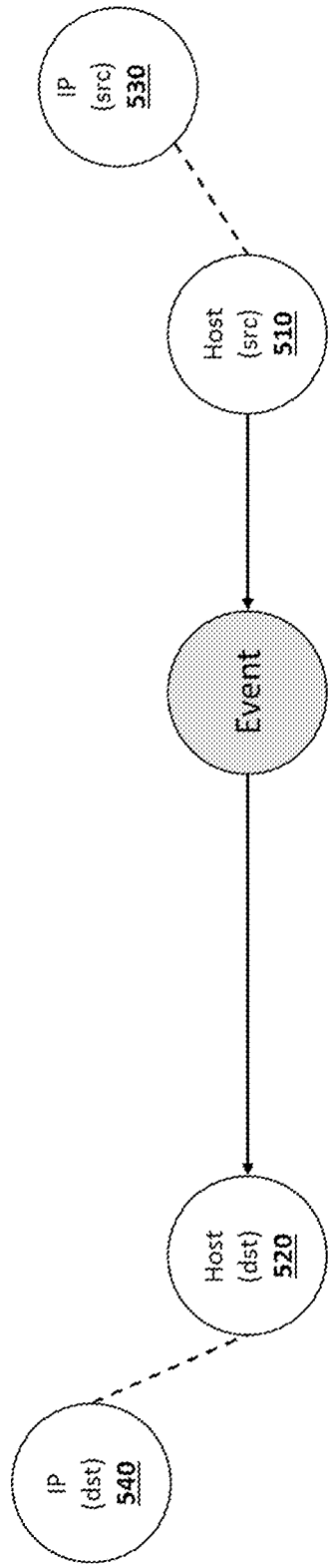

FIG. 5 illustrates a graph 500 of modeling of an event using a host-to-host model. The event is generated by Websense® Email Security Gateway (ESG). The ESG product filters malicious threats from entering an organization's network. The reported event indicates a potential malicious connection between two host entities: a source host (src) 510 and a destination host (dst) 520. In this example, additional source and destination entities 530 and 540, respectively, such as IP addresses of the respective hosts, can be displayed upon the user request.

As demonstrated above, the modeling can be performed based on events generated by different products and different threats. It should be noted that the events can be reported by SIEM systems. Each SIEM system reports an event with a different set of attributes. For example, one SIEM system may report an event with the following attributes: bytes-in; bytes-out; category outcome; target port; request method; policy; device event category; application protocol; and device action. Another SIEM system may report the same event using the following attributes: destination port; application protocol; method; category; bytes_sent; and bytes-_received. The threat investigation system 130 would model the same event type to the same model type regardless of its reporting source.

Figure 7:
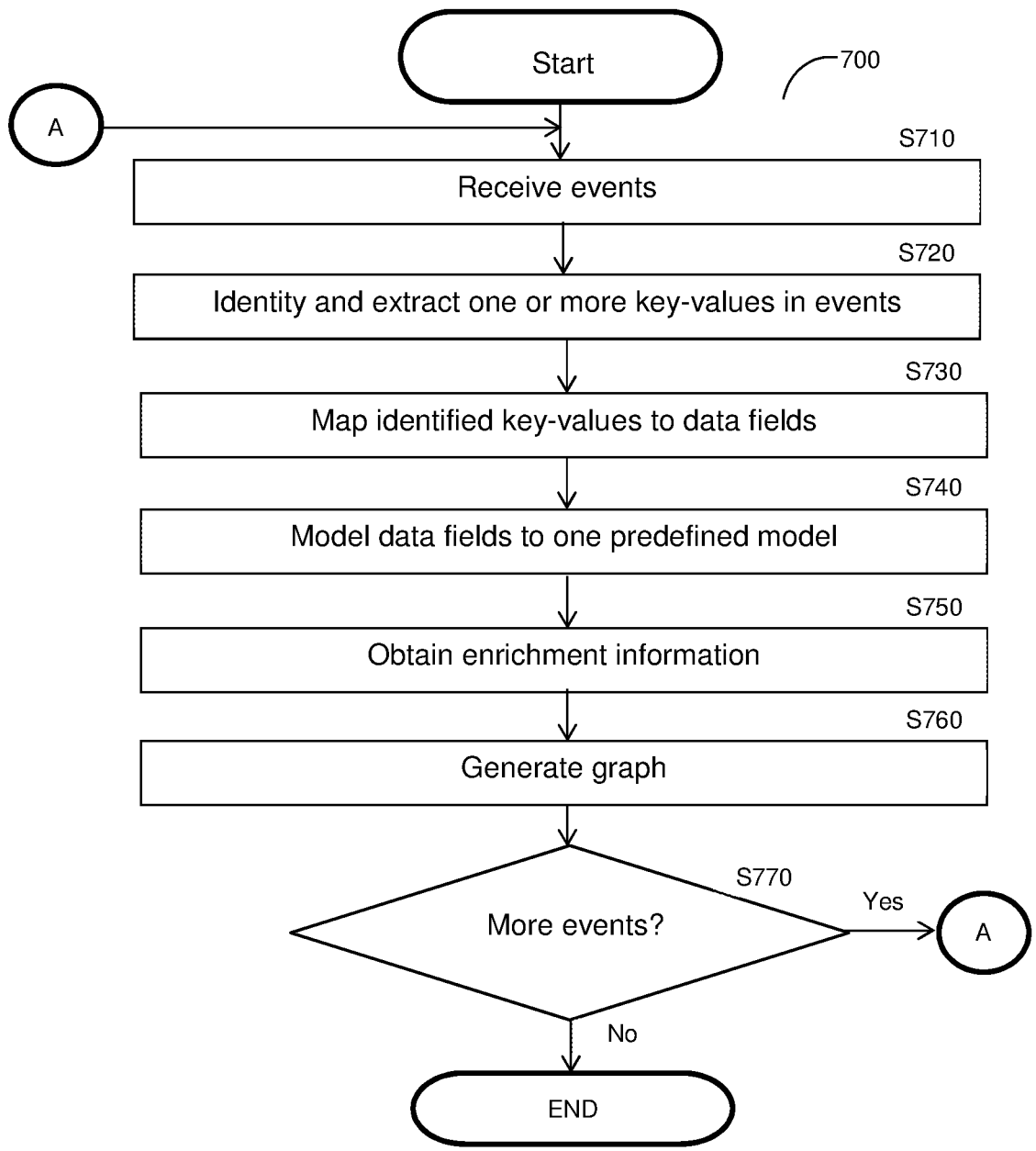
FIG. 7 is a flowchart illustrating a method for modeling security events according to an embodiment.

FIG. 7 is an example flowchart 700 illustrating a method for modeling security events according to an embodiment. At S710, cyber-security events are received from one or more data sources. As noted above, such events are either pushed or pulled from SIEM systems, events management repositories, security detection systems, WAFs, database (DB) security systems, endpoint security systems, and NAC systems, case management systems, application programming interfaces (APIs), a combination thereof, and the like. The events may be at a different format and carry different attributes. In an embodiment, the events are received as text files and in a tubular representation in the formats mentioned above (e.g., CSV and JSON).

Each event includes a plurality of data attributes, for which values and representations depend on the system reporting the event. For example, such data attributes may include application (app), bytes-in, cause, change type, date, destination interface, destination IP address, destination port, destination translated IP, destination translated port, duration, event type, host, index line count, log-level, message ID, object category, product, service, session ID, source type, server source, source interface, source IP address, source port, source translated IP, source translated port, status code destination, threat reason, user type, vendor, vendor class, vendor definition, and so on. Some of the data attributes may be empty and some may be duplicated.

At S720, each event is processed to at least identify and extract one or more key-values. A key-value is a data attribute in the event that is required to model the event. In an embodiment, at least the key-values including an event type and product are required in order to map the event. Other key-values that can be utilized in generating a complete graph may be extracted, if such key-values exist. For example, IP addresses (source and destination), host names, vendor, time, and other information may be extracted as well.

At S730, the extracted key-values are mapped to a predefined set of data fields. The data fields provide a unified representation for different attributes having the same value or meaning across different products or within the same event. As an example, an event may include the following data attributes "source" and "source IP" having the same value of '192.168.1.2'. These two attributes are mapped to the same field designating a source IP address. As another example, a communication port may be designated by one tool as a "Target Port" while by another as a "Destination Port". The same data attributes may be mapped to a data field "Destination Port".

The set of data fields include, for example, vendor, product, event type, source IP Address, destination IP address, source host name, destination host name, source user, and destination user. It should be noted that not all of these fields are required to model the event. In some cases, some of the fields are kept empty.

At S740, using the contents of the data of fields, the respective event is modelled. In an embodiment, the modeling includes selecting one model from a set of predefined models. Based on the selected model, various entities and connection between the entities are determined.

According to an example embodiment, a predefined model may include, but is not limited, user-to-user, host-to-user, host-to-host, and host-to-itself models. Each model may represent a class of similar events or a cyber-threat. For example, a host-to-itself model may relate to an anti-virus alert threat; a host-to-host model may relate to a firewall type of events; a user-to-host model may relate to a malicious activity performed by a user on a target host; a user-to-user model may relate to activity being performed between two users (e.g., spam emails).

The determined entity may be, for example, a host or a user. For each entity, it is further determined if it is a primary or secondary entity. The event direction of a connection between entities is further determined using a rule identifying the flow between the primary entities involved in the event. For example, an event direction may be inbound, outbound, or self. The connection types may include primary to secondary entities, primary to primary, secondary to primary, and secondary to secondary. Additional connections are based on artifacts (provides an information layer on an event).

In an embodiment, S740 is performed using a set of modeling rules. A modeling rule determines the type of model that can be used for the respective event, per each product generating the event. That is, the modeling rule is defined to operate on a security product originally generated the received event and agnostic to a data source reported the received event. Each modeling rule further defines the entities that can be linked to the event, and for each entity if such an entity is a secondary or primary entity.

Following is a non-limiting example for modeling rule:
If Product={Cisco Adaptive Security Appliance (ASA) or ASA or PIX or cisco:asa or cisco:pix} AND {Source-Host is not empty AND DestinationHost is not empty}; then connect event between the SourceHost and DestinationHost AND set SourceHost as a Primary Source and DestinationHost as Secondary Source};
   If SourceAddress is not empty; then linked to the SourceHost; and
   If Source User is not empty; then linked to the Source-Host.

Figure 6:
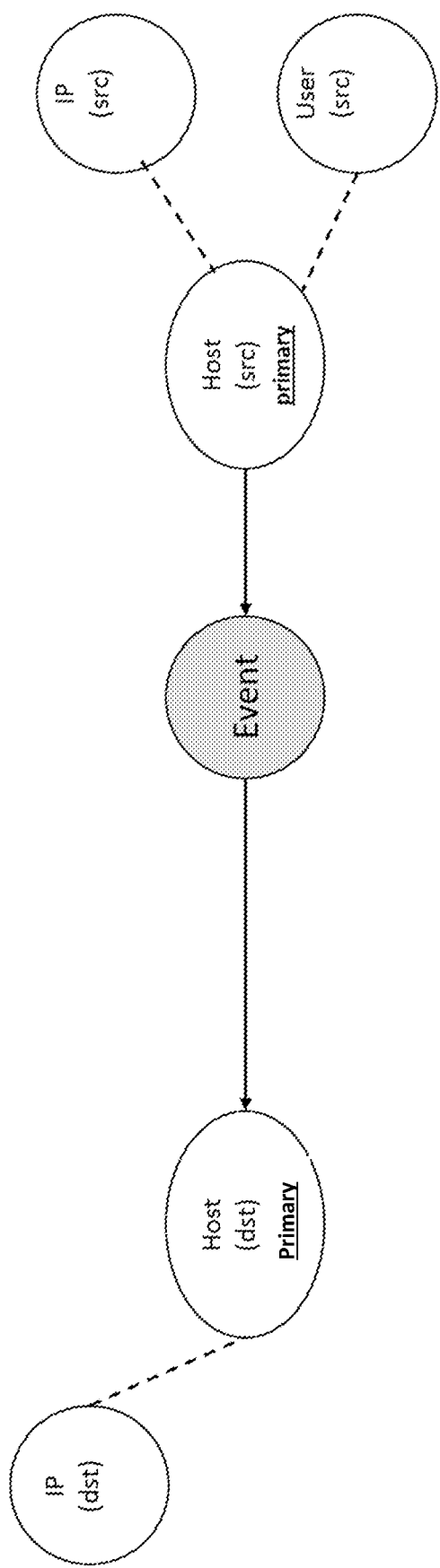

FIG. 6 shows an example graph 600 generated if all conditions in the above example rules are met.

In an embodiment, for each vendor-product, a set of modeling rules are defined. It should be noted that a primary entity may be a main identifier of the attacker (e.g., includes a host or a user), while a secondary entity may be sub-identifiers associated with the attackers (e.g., an IP address). In addition, an artifact, such as a MAC address may be associated with the primary entity. It should be further noted that relationship type can be determined based on a rule that checks the connection type between the primary entities involved in the event. The relationship type may be user to user, user to host, host to host, and self-event.

Optionally, at S750, enrichment information related to the events may be retrieved respective of the events. The enrichment information may include, but is not limited to, entity enrichment information, threat intelligence information, and so on. The entity enrichment information may include, but is not limited to, whether each entity is an internal entity or an external entity. The threat intelligence information may be respective of monitoring of commercial feeds, open source systems, information sharing and analysis centers, exit nodes, and so on.

At S760, a graph is generated based on the modeling results. The graph may represent relationships between the entities respective of the events associated with the entities as determined at S740. In an embodiment, S760 may further include storing the generated graph.

As demonstrated by the various example graphs (e.g., FIGS. 2-6), such graphs may be utilized to generate a visual illustration of the contextually clustered events. The graph may be generated in real-time and updated as new events are received and processed. Accordingly, the visual illustration allows a user (e.g., a cyber security expert) viewing the visual illustration to conduct a real-time investigation into the various graphed events and entities. Further, the visual illustration of the entities and their connections through a graph allows the user to conduct a drill-down analysis of the various entities.

At S770, it is checked whether additional events have been received and, if so, execution continues with S710; otherwise, execution terminates. It should be noted that the generated graph may be updated as new events are received.

Figure 8:
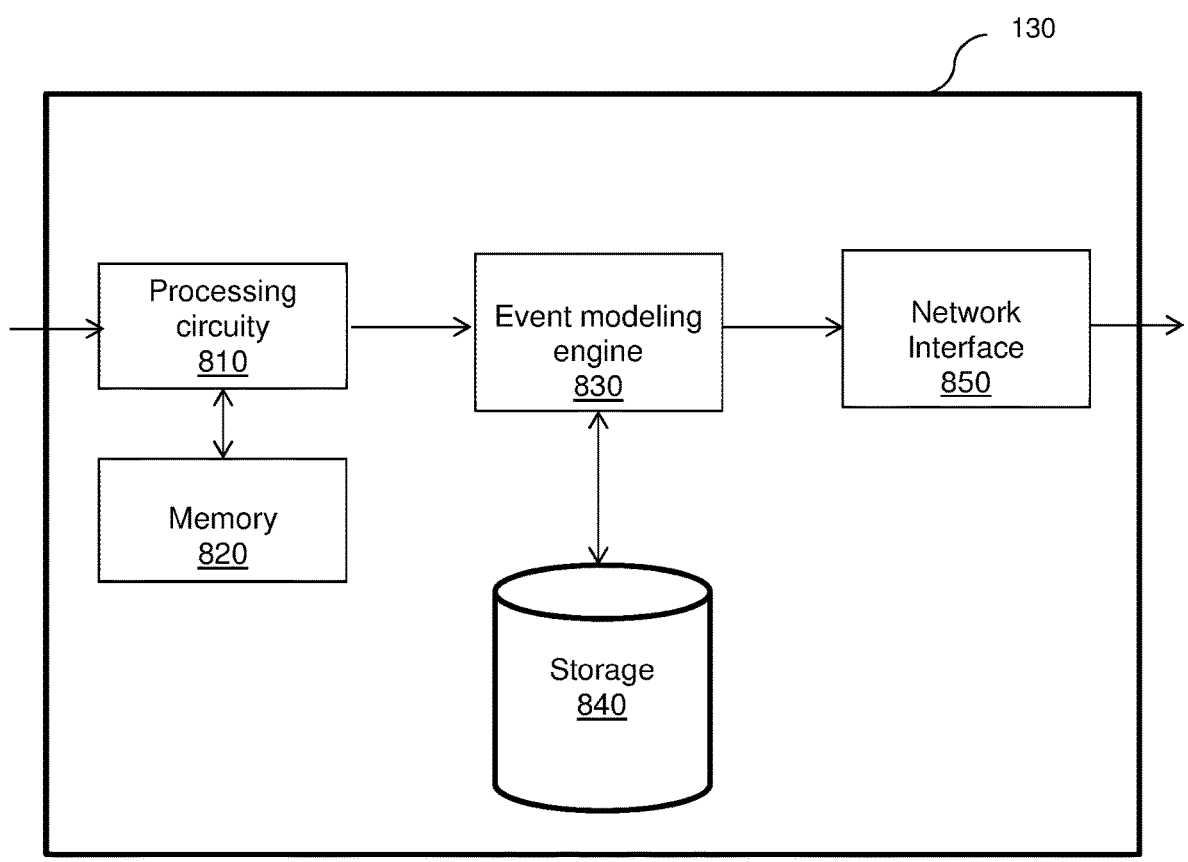
FIG. 8 is a block diagram of a threat investigation system (TIS) implemented according to one embodiment.

FIG. 8 is an example block diagram of the threat investigation system 130 according to an embodiment. The threat investigation system 130 includes a processing circuitry 810 coupled to a memory 820, an event modeling engine 830, a storage 840, and a network interface 850.

The processing circuitry 810 may be realized by one or more hardware logic components and circuits. For example, and without limitation, illustrative types of hardware logic components that can be used include Field Programmable Gate Arrays (FPGAs), Application-specific Integrated Circuits (ASICs), general-purpose microprocessors, microcontrollers, digital signal processors (DSPs), and the like, or any other hardware logic components that can perform calculations or other manipulations of information. The memory 820 may be volatile (e.g., RAM, etc.), non-volatile (e.g., ROM, flash memory, etc.), or a combination thereof.

The storage 840 may be magnetic storage, optical storage, and the like and may be realized, for example, as flash memory or other memory technology, CD-ROM, digital versatile disks (DVDs) or other optical storage, magnetic cassettes, magnetic tape, a network storage (NFS), magnetic disk storage or other magnetic storage devices, or any other medium which can be used to store the desired information.

In one configuration, computer readable instructions to implement one or more embodiments disclosed herein may be stored in the storage 840. The storage 840 may also store other computer readable instructions to implement an operating system, an application program, and the like. Computer readable instructions may be loaded in the memory 820 for execution by the processing circuitry 810. The storage 840 is configured to store, for example, received events, modeled events, data structures, and so on.

In another embodiment, the storage 840, the memory 820, or both are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 810 to perform the various functions described herein.

The network interface 850 allows the threat investigation system 130 to communicate with data sources (e.g., the data sources 110) to gather the events and with client devices to send the modeling results and generated graphs. The network interface 850 may include a modem, a network interface card (NIC), an integrated network interface, a radio frequency transmitter/receiver, an infrared port, a USB connection, and the like.

The event modeling engine 830 is configured to generate graphical representations of models based on received events. Each graphical representation shows its entities, connections, and relationship characteristics. The relationship characteristics include whether an entity is a primary or secondary entity, a relationship type, an event direction, a connection type between entities in the event, entity groups, and so on. As discussed in greater detail below, the event modeling may include processing events to identity key-values; mapping key-values to a set of data fields; and modeling, using one more rules, the contents of the data fields to a model's type to map the connections, entities, and relationship characteristics. In an embodiment, the network interface 850 can be realized by one or more hardware logic components and circuits.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computer-implemented method for modeling cyber-security events, comprising:
    receiving a plurality of cyber-security events, wherein each of the plurality of the cyber-security events defines at least one entity, and wherein at least two of the plurality of cyber-security events are received from different respective security systems each being of a different type;
    for each of the plurality of received cyber-security events, processing the received cyber-security event to identify at least one key-value, wherein a key-value is a data attribute in an event that is required to model the event;
    mapping the at least one identified key-value to at least one predefined data field, of a unified representation for different attributes having commonality;
    modeling the received cyber-security event to a security model selected from a set of at least two security models, wherein each security model defines a specific activity related to the at least one entity, wherein the modeling is based on at least one modeling rule and the at least one identified key-value;
    wherein each modeling rule is defined to operate on a security product originally generated the received security-event and agnostic to a data source reported the received security event, and
    generating a graph based on the selected security model.

2. The method of claim 1, further comprising:
    determining at least one of: connections related to the at least one entity, and relationship characteristics related to the at least one entity.

3. The method of claim 2, wherein the relationship characteristics include at least one of: a primary entity, a secondary entity, a relationship type, an event direction, a connection type between entities in the event, and an artifact.

4. The method of claim 1, wherein each of the at least one entity is any one of: a host, a user, and a network address.

5. The method of claim 4, wherein the selected security model is any one of: a host-to-host model; a host-to-user model; a user-to-user model; and a host-to-itself model.

6. The method of claim 1, further comprising:
    retrieving enrichment information related to the at least one entity; and
    enriching the selected security model using the enrichment information.

7. The method of claim 1, wherein the data source is any one of: a security information management (SIM) system, a security event management (SEM) system, a security information and event management (SIEM) system, an events management repository, a security product, a case management system, and an application programming interfaces (API).

8. The method of claim 1, wherein different attributes have commonality when they have at least one of the same value and the same meaning for at least one of across of different products and within a same event.

9. A non-transitory computer readable medium having stored thereon instructions for causing one or more processing units to execute a method for modeling cyber-security events, comprising:
    receiving a plurality of cyber-security events, wherein each of the plurality of the cyber-security events defines at least one entity, and wherein at least two of the plurality of cyber-security events are received from different respective security systems each being of a different type;

for each of the plurality of received cyber-security events, processing the received cyber-security event to identify at least one key-value, wherein a key-value is a data attribute in an event that is required to model the event;

mapping the at least one identified key-value to at least one predefined data field, of a unified representation for different attributes having commonality;

modeling the received cyber-security event to a security model selected from a set of at least two security models, wherein each security model defines a specific activity related to the at least one entity, wherein the modeling is based on at least one modeling rule and the at least one identified key-value;

wherein each modeling rule is defined to operate on a security product originally generated the received security-event and agnostic to a data source reported the received security event, and generating a graph based on the selected security mode.

10. A system for contextually analyzing potential security threats, comprising:

a processing circuitry; and a memory, the memory containing instructions that, when executed by the processing circuitry, configure the system to:

receive a plurality of cyber-security events, wherein each of the plurality of the cyber-security events defines at least one entity, and wherein at least two of the plurality of cyber-security events are received from different respective security systems each being of a different type;

for each of the plurality of received cyber-security events, processing the received cyber-security event to identify at least one key-value, wherein a key-value is a data attribute in an event that is required to model the event;

map the at least one identified key-value to at least one predefined data field, of a unified representation for different attributes having commonality;

model the received cyber-security event to a security model selected from a set of at least two security models, wherein each security model defines a specific activity related to the at least one entity, wherein the modeling is based on at least one modeling rule and the at least one identified key-value;

wherein each modeling rule is defined to operate on a security product originally generated the received security-event and agnostic to a data source reported the received security event, and generate a graph based on the selected security model.

11. The system of claim 10, wherein the system is further configured to:

determine at least one of: connections related to the at least one entity, and relationship characteristics related to the at least one entity.

12. The system of claim 11, wherein the relationship characteristics include at least one of: a primary entity, a secondary entity, a relationship type, an event direction, a connection type between entities in the event, and an artifact.

13. The system of claim 10, wherein each of the at least one entity is any one of: a host, a user, and a network address.

14. The system of claim 13, wherein the selected security model is any one of: a host-to-host model; a host-to-user model; a user-to-user model; and a host-to-itself model.

15. The system of claim 10, wherein the system is further configured to:

retrieve enrichment information related to the at least one entity; and enrich the selected security model using the enrichment information.

16. The system of claim 10, wherein the data source is any one of: a security information management (SIM) system, a security event management (SEM) system, a security information and event management (SIEM) system, an events management repository, a security product, a case management system, and an application programming interfaces (API).

17. The system of claim 10, wherein different attributes have commonality when they have at least one of the same value and the same meaning for at least one of across of different products and within a same event.

* * * * *